(12) United States Patent
McDaniel et al.

(10) Patent No.: US 8,392,120 B2
(45) Date of Patent: Mar. 5, 2013

(54) METHOD AND TOOL FOR DETERMINATION OF FRACTURE GEOMETRY IN SUBTERRANEAN FORMATIONS BASED ON IN-SITU NEUTRON ACTIVATION ANALYSIS

(75) Inventors: Robert R. McDaniel, Houston, TX (US); Cody Ryan Peeples, Raleigh, NC (US); Robin Pierce Gardner, Raleigh, NC (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 67 days.

(21) Appl. No.: 13/093,296

(22) Filed: Apr. 25, 2011

(65) Prior Publication Data

US 2011/0257948 A1 Oct. 20, 2011

Related U.S. Application Data

(63) Continuation of application No. 12/268,856, filed on Nov. 11, 2008, now Pat. No. 7,933,718, which is a continuation-in-part of application No. 11/501,575, filed on Aug. 9, 2006, now Pat. No. 7,726,397.

(51) Int. Cl.
*G01V 5/00* (2006.01)
*G01V 15/00* (2006.01)
*G06F 19/00* (2011.01)
*G06F 17/40* (2006.01)

(52) U.S. Cl. . 702/11; 73/152.15; 73/865.8; 166/250.01; 166/250.1; 175/41; 175/50; 250/269.6; 702/1; 702/6; 702/127

(58) Field of Classification Search ............... 73/152.01, 73/152.02, 152.14, 432.1, 865.8; 166/243, 166/244.1, 247, 250.01, 250.1; 175/40, 41, 175/50; 250/253, 256, 259, 260, 269.1, 269.3, 250/269.6, 306, 308, 526; 378/1, 70, 82, 378/86, 210; 702/1, 2, 6, 8, 11, 127, 187, 702/189
See application file for complete search history.

(56) References Cited

U.S. PATENT DOCUMENTS

| | | | |
|---|---|---|---|
| 2,685,038 A * | 7/1954 | Hoss | 250/260 |
| 3,002,091 A | 9/1961 | Armstrong | |
| 3,004,161 A | 10/1961 | Rickard | |
| 3,019,341 A | 1/1962 | Monaghan | |
| 4,034,218 A | 7/1977 | Turcotte | |
| 4,178,506 A * | 12/1979 | Fertl | 250/260 |
| 4,220,205 A | 9/1980 | Coursen et al. | |
| 4,342,911 A | 8/1982 | French | |
| 4,439,677 A | 3/1984 | Martin | |
| 4,471,435 A | 9/1984 | Meisner | |
| 4,722,220 A | 2/1988 | Herron | |
| 4,731,531 A | 3/1988 | Handke et al. | |
| 4,926,940 A | 5/1990 | Stromswold | |
| 4,958,073 A | 9/1990 | Becker et al. | |
| 5,243,190 A | 9/1993 | Bandy et al. | |
| 5,322,126 A | 6/1994 | Scott, III | |
| 5,413,179 A | 5/1995 | Scott, III | |
| 5,441,110 A | 8/1995 | Scott, III | |
| 5,442,173 A | 8/1995 | Wraight | |
| 5,572,021 A | 11/1996 | Heathman et al. | |
| 5,619,411 A | 4/1997 | Smith | |
| 5,635,712 A * | 6/1997 | Scott et al. | 250/260 |

(Continued)

FOREIGN PATENT DOCUMENTS

WO WO 2008/036982 3/2008

*Primary Examiner* — Edward Cosimano (57) ABSTRACT

A method for determining fracture geometry of a subterranean formation from radiation emitted from a fracture in the formation, including measuring gamma-radiation emitted from the fracture; subtracting background radiation from the measured gamma-radiation to obtain a peak-energy measurement; comparing the peak-energy measurement with a gamma-ray transport/spectrometer response model; and determining formation fracture geometry of the fracture in accordance with values associated with the response model.

15 Claims, 6 Drawing Sheets

U.S. PATENT DOCUMENTS

| | | | |
|---|---|---|---|
| 5,783,822 A | 7/1998 | Buchanan et al. | |
| 5,847,384 A | 12/1998 | Mathis | |
| 5,973,321 A | 10/1999 | Schmidt | |
| 6,691,780 B2 | 2/2004 | Nguyen et al. | |
| 7,424,911 B2 | 9/2008 | McCarthy et al. | |
| 7,726,397 B2 | 6/2010 | McDaniel et al. | |
| 7,933,718 B2 * | 4/2011 | McDaniel et al. | 702/11 |
| 8,100,177 B2 * | 1/2012 | Smith et al. | 166/250.1 |
| 8,129,318 B2 * | 3/2012 | McDaniel et al. | 507/271 |
| 8,214,151 B2 * | 7/2012 | Duenckel et al. | 702/8 |
| 8,234,072 B2 * | 7/2012 | Smith et al. | 702/8 |
| 2006/0102345 A1 | 5/2006 | McCarthy et al. | |
| 2007/0034373 A1 | 2/2007 | McDaniel et al. | |
| 2007/0199704 A1 | 8/2007 | Hocking | |
| 2007/0284518 A1 | 12/2007 | Randall | |
| 2008/0062036 A1 | 3/2008 | Funk et al. | |
| 2009/0090505 A1 * | 4/2009 | McDaniel et al. | 166/250.1 |
| 2009/0205825 A1 * | 8/2009 | Smith et al. | 166/280.1 |
| 2009/0210161 A1 * | 8/2009 | Duenckel et al. | 702/8 |
| 2010/0234249 A1 * | 9/2010 | McDaniel et al. | 507/224 |
| 2011/0001040 A1 * | 1/2011 | Smith et al. | 250/264 |
| 2011/0272146 A1 * | 11/2011 | Green et al. | 166/250.1 |
| 2012/0031613 A1 * | 2/2012 | Green | 166/280.1 |
| 2012/0080588 A1 * | 4/2012 | Smith et al. | 250/269.6 |
| 2012/0135894 A1 * | 5/2012 | McDaniel et al. | 507/220 |
| 2012/0175511 A1 * | 7/2012 | Masnyk et al. | 250/259 |

* cited by examiner

METHOD AND TOOL FOR DETERMINATION OF FRACTURE GEOMETRY IN SUBTERRANEAN FORMATIONS BASED ON IN-SITU NEUTRON ACTIVATION ANALYSIS

CROSS-REFERENCE TO RELATED APPLICATION AND CLAIM OF PRIORITY

This application is a continuation of U.S. application Ser. No. 12/268,856, filed Nov. 11, 2008, now U.S. Pat. No. 7,933,718, which application is a continuation-in-part of application Ser. No. 11/501,575 filed Aug. 9, 2006, now U.S. Pat. No. 7,726,397, which all applications are incorporated herein by reference in their entirety.

FIELD OF THE INVENTION

The present invention relates to methods for determining fracture geometry in subterranean formations, such as found in bored wells for oil and natural gas production.

BACKGROUND OF THE INVENTION

The yield of hydrocarbons, such as gas and petroleum, from subterranean formations can be increased by fracturing the formation in order to stimulate the flow of these hydrocarbons in the formation. Various formation fracturing procedures are now used, such as, for example, hydraulic fracturing in which liquids, gases and or combinations of both are injected into the formation under high pressure (usually with propping agents).

Hydraulic fracturing is often used in the industry for improving oil and natural gas production from subterranean formations. During a hydraulic fracturing operation, a fluid, generally termed a "pad," is pumped down a well at sufficient pressure to crack or fracture open the formation surrounding the well. Once a fracture has been created, the pumping of the pad, along with a slurry phase that comprises both the liquid and a proppant, is begun until a sufficient volume of the proppant has been carried by the slurry into the fracture. After a suitable time, the pumping operation is stopped at which time the proppant will prop open the fracture in the formation, thereby preventing it from closing. As a result of the fracture, trapped hydrocarbons are provided a more conductive pathway to the wellbore than was previously available, thereby increasing the well's production. In addition to creating deep-penetrating fractures, the fracturing process is useful in overcoming wellbore damage, to aid in secondary operations and to assist in the injection or disposal of produced formation brine water or industrial waste material.

During the fracturing process, the fractures propagate throughout the formation. The vertical propagation of these fractures is useful in determining the extent of fracture coverage as it relates to the producing interval. Fracture height measurements aid well operators in determining the success of the fracturing operation and, if necessary, to optimize future treatments for other wells in the field. In addition, fracture height information can aid in the diagnosis of stimulation problems such as lower production rates or unfavorable water cuts. The fracture height data can indicate whether communication has been established between the producing formation and adjacent water or non-hydrocarbon producing formation zones. Height measurements also provide a check on the accuracy of fracture design simulators used prior to the job to predict fracture geometry. If excessive fracture height growth is determined this would imply that the fracture length is shorter than the designed value.

As stated above, one reason for monitoring the vertical propagation of a fracture is the concern for fracturing outside of a defined hydrocarbon-producing zone into an adjacent water-producing zone. When this occurs, water will flow into the hydrocarbon-producing zone and the wellbore, resulting in a well that produces mainly water instead of the desired hydrocarbon. Furthermore, if there is still the desire to continue producing hydrocarbons from the well, operators must solve the serious problem of safely disposing of the undesired water. Addressing the problems arising from an out-of-zone fracture will also add expenses to the operation. In addition, if the fracture propagates into an adjacent non-hydrocarbon producing formation, the materials used to maintain a fracture after the fluid pressure has decreased may be wasted in areas outside the productive formation area. In short, it is expensive to efficiently operate a well that has been fractured out of the hydrocarbon-producing zone.

Because of the serious problems that can occur as a result of out-of-zone fractures, it is desirable to determine formation fracture development. Several techniques and devices are known for monitoring and evaluating formation fracture development, such as radioactive tracers in the fracturing fluid, temperature logs, borehole televiewers, passive acoustics and gamma-ray logging. Most techniques provide some direct estimates of fractured zone height at the wellbore.

One known process used to determine formation fracture height development employs a radioactive tracer. In this process, a fracturing fluid containing a radioactive tracer is injected into the formation to create and extend the fractures. When these radioactive fluid and proppant tracers are used, post fracture gamma-ray logs have shown higher levels of activity opposite where the tracer was deposited, thereby enabling operators to estimate the vertical development of the propped fractures.

Another approach for determining fracture height uses temperature and gamma-ray logs. Temperature logs made before and after stimulation are compared to define an interval cooled by injection of the fracturing fluid and thus provide an estimate of the fractured zone. However, this technique is subject to limitations and ambiguities. For example, the temperature log may be difficult to interpret because of low temperature contrast, flowback from the formation before and after the treatment, or fluid movement behind the borehole casing. In addition, the use of radioactive tracers may give rise to environmental problems such as the pollution of underground water streams, and the like, and hence be undesirable.

Other known methods for evaluating fracture geometry include using a borehole televiewer or using acoustical methods. Utilizing a borehole televiewer is limited in that it can only be used for fracture height evaluation in open holes. In addition, utilizing a borehole televiewer is limited due to the extreme temperature and pressure conditions present in deeper completions. Acoustical methods are hampered by inhomogeneous formation impedance and/or the need for pumping while the tool is in the wellbore.

In addition to the problems associated with each type of known monitoring method, there are inherent problems in the formation fracturing technology. During the fracturing process, fracture fluid is generally pumped into the formation at high pressure, to force open the fractures, and an increasing proportion of sand is added to the fluid to prop open the resulting fractures. One problem with the existing technology is that the methods for determining whether a formation has been fractured out of the production zone relies on post-treatment (i.e. after the fracture has occurred) measurements. In such systems, a fracturing treatment is performed, the treatment is stopped, the well is tested and the data is analyzed. Moreover, with existing detection systems, the wait for post-fracturing data can take a considerable amount of time, even up to several days, which can delay the completion operations, resulting in higher completion and operating costs.

Another problem associated with existing post-process "logging" or measuring devices is that the cost associated with interrupting a fracturing job in order to make a measurement of a fracture is neither practical nor feasible. Because the fracturing fluid is pumped into a formation under high pressures during the fracturing process, temporarily halting the pumping during the fracturing operation will result in the application of pressure to the fracturing fluid by the walls of the formation fracture. This could lead to undesirable results such as the closing of the fractures, thereby causing the reversal of fluid flow back into the borehole, or the build-up of sand in the hole. In addition, after taking measurements and completing the logging process, operators cannot restart the pumping equipment at the point of the fracturing process immediately before the interruption. Instead, the operators would have to repeat the complete fracturing job at additional cost and with unpredictable results.

A fracture monitoring system that does not require interrupting a fracturing job could address the above-described problems and would allow well operators to monitor the fracturing process, to control fracture dimensions and to efficiently place higher concentrations of proppants in a desired formation location. In addition, if there is information that a fracture is close to extending outside the desired zone, operators can terminate the fracturing job immediately. Furthermore, analysis of the ongoing treatment procedure will enable an operator to determine when it is necessary to pump greater concentrations of the proppant, depending on factors such as the vertical and lateral proximity of oil/water contacts with respect to the wellbore, the presence or absence of water-producing formations and horizontal changes in the physical properties of the reservoir rock.

SUMMARY OF THE INVENTION

The present invention solves the existing problems in the art by providing a method for analyzing the results of a fracturing process by collecting and analyzing well logging data, comprising disposing in a formation fracture, a proppant and/or a fracturing fluid that comprises a radiation susceptible material, during a single logging pass irradiating the radiation susceptible material with neutrons; measuring gamma-radiation emitted from the radiation susceptible material; and processing the measured gamma-radiation data in accordance with a Monte Carlo-based simulation model to obtain an estimated fracture geometry (e.g. propped height and/or propped fracture width near the wellbore).

In accordance with embodiment, a method is provided for modeling geometrical parameters of a proppant filled fracture in a subterranean formation detected by collecting gamma-radiation data stimulated by a neutron source, including obtaining neutron transport data by applying neutron source parameters and subterranean formation parameters to a Monte Carlo simulation; obtaining gamma-ray buildup/decay profile data by integrating said neutron transport data; generating a gamma-ray transport/spectrometer response model by applying a Monte Carlo simulation to said gamma-ray buildup/decay profile data; and creating a gamma-ray transport/spectrometer response database correlating gamma-radiation spectra with subterranean formation proppant filled fracture geometry parameters. We also rely on the ability to generate spectrometer response data by MC simulation from other nuclides which become activated in the irradiation. That data is needed to determine what contribution from the experimentally observed spectrum is not from the tag, and therefore to isolate from the complex spectrum the part that is from the activation of the tag.

In accordance with another aspect of the invention, a method is provided for determining fracture geometry of a subterranean formation from radiation emitted from a fracture in said formation, including measuring gamma-radiation emitted from the fracture; subtracting background radiation from said measured gamma-radiation to obtain a peak-energy measurement; comparing said peak-energy measurement with a gamma-ray transport/spectrometer response model; and determining formation fracture geometry of said fracture in accordance with values associated with said response model. First, all radiation is measured. Background from the upper detector is subtracted, then interfering signatures from other activation products are accounted for to determine the tag's contribution. When the tag's contribution is known, it can be related to the amount of proppant present and thus to the fracture width. The observed spectrum is seen as a combination of signature spectra, where each activation product (including but not limited to the tag) has its own signature. This 'signature' approach is what we call Library Least Squares, and we call the 'signatures' Library Spectra. The library spectrum for the tag has been quantitatively indexed by applying the whole NT/RBD/GRT-DR simulation, so that the result of the Library Least Squares provides a quantitative estimate of most likely tag concentration which would have produced that observed spectrum.

DETAILED DESCRIPTION OF THE INVENTION

In accordance with the present invention, a method for determining fracture geometry uses environmentally friendly materials. These environmentally friendly materials are non-radioactive until bombarded by neutrons and will be referred to as radiation susceptible materials. In one embodiment, the method involves determining the geometry (i.e. aspects of proppant packed height and width) of a fracture created in a formation using target elements that comprise the radiation susceptible materials. The radiation susceptible materials have a short half-life, which advantageously permits them to be used in a formation while at the same time minimizing any adverse environmental impact, either from handling or having the proppant flow back out of the well either during clean-up or when the well is put back on production.

Radiation susceptible materials as defined herein are those that become radioactive upon bombardment by neutrons. The radiation susceptible materials can advantageously be disposed in the fracturing fluid, or in a coating disposed upon a proppant that is disposed in the fracturing fluid or as a part of core of the proppant itself. The fracturing fluid or the proppant that comprises the radiation susceptible material can be used during a hydraulic fracturing treatment. The fracturing fluid and/or the proppants that comprise the radiation susceptible materials are injected into the formation during the creation of the fracture. After being injected into the fracture, the radiation susceptible materials are irradiated with neutrons from a neutron source contained in a logging tool. Gamma radiation emitted from the radiation susceptible materials is counted by detectors contained in the logging tool. Since the radiation susceptible materials have a short half-life, these materials become radioactive for only a brief period of time. The location of the gamma radiation is used to determine the placement of the radiation susceptible materials in the fracture and is also used to determine aspects of the proppant filled fracture geometry, such as propped fracture height and propped fracture width.

Generally, the radiation detector generates a "spectrum" in the presence of radiation of different energies, i.e. peak, scatter and background, as well as radiation of different isotopes. As a photon hits the detector, its energy is converted to an electrical signal that is processed. Photons of different energies will generate electrical signals of different values. The summation of these will result in an energy spectrum. Generally, at least two of the detectors have the capability to not only count the number of rays that hit the detector but also determine the energy level associated with that particular emission.

Typically a known and consistent concentration of the radiation susceptible material (also termed a "tag") is employed to facilitate calculating a propped fracture width. Preferably, the tag could either be in the coating or in the body of the proppant.

The present method is advantageous in that background radiation acquired during the activation of the radiation susceptible materials can be collected in a single pass and subtracted from the peak energy radiation. All other commercially available processes generally use two or more logging passes to determine the fracture geometry of the fractured formation, where a first logging pass to measure background is typically performed before the fracturing treatment has begun, as the prior art uses radioactive tracers that are added to the proppant and the fracturing fluid as the fracturing treatment is being performed, and thus once the proppant is present background could no longer be measured. The acquired background radiation generally comprises multiple contributions from a number of sources. A first contribution can generally be acquired from naturally occurring radioactive elements such as uranium, potassium, and/or thorium. Over time, fine-grained formations can trap minerals and fluids containing these naturally radioactive elements. When the radiation susceptible materials in the formation are activated by neutrons, these naturally occurring radioactive materials will also emit radiation, which is acquired as background radiation.

A second contribution to the background is that induced by neutron radiation being presently used to activate the radiation susceptible materials. This radiation emanates mainly from aluminum and silicon present in the formation and/or the proppant. Background radiation from iron/manganese used in the wellbore casing may also be a part of this third contribution. In accordance with one aspect of the invention, the well containing the radiation susceptible material that has been exposed to a neutron source is logged at an uncharacteristic slow rate, such as on the order of 2 feet per minute. Logging, at this slower rate allows time for any neutron-stimulated emissions from naturally occurring elements to decrease relative to the emissions from the radiation susceptible tag. This helps in separating the energy peaks associated with naturally occurring elements from those of the radiation susceptible tracer. This makes the analysis on the logging data easier and the results more accurate.

It is desirable to remove all traces of background radiation from the peak energy radiation prior to calculation of fracture geometry. In one embodiment, the peak energy radiation measurements as well as background radiation measurements are made in a single pass, and the background radiation measurements are subtracted from the peak energy radiation measurements in a single pass. This is preferably done by having two spectrum detectors in the logging tool. As explained below, the upper detector is used to measure natural background radiation, while the tool should be lowered as quickly as possible, though, to prevent much activation from occurring on the way down. This is particularly true for radioisotopes with long half-lives.

The radiation susceptible materials can be disposed in a proppant that is introduced into the fracture to prop open the fracture. In one embodiment, the proppant can comprise a substrate upon which is disposed a coating comprising the radiation susceptible material. In another embodiment, the substrate can comprise the radiation susceptible material. When a proppant and/or fracturing fluid comprises a radiation susceptible material, it is said to be tagged with the radiation susceptible material. The term "tagging" as used herein implies that the proppant and/or the fracturing fluid comprises radiation susceptible materials. Thus, when a coating disposed on a substrate comprises radiation susceptible materials, the proppant is said to be tagged with a radiation susceptible material.

Figure 1:
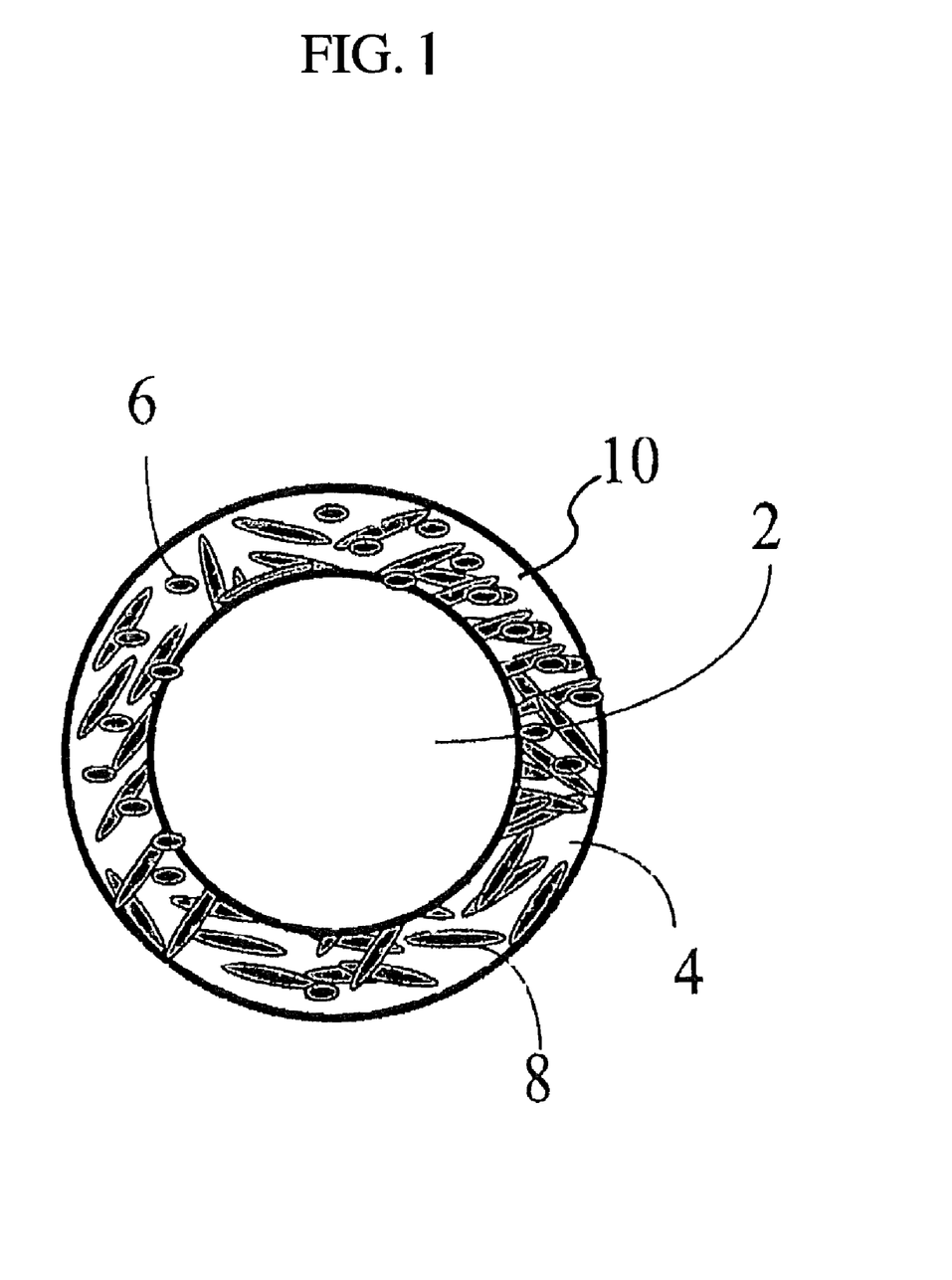
FIG. 1 depicts an exemplary embodiment of a proppant comprising a solid core upon which is disposed an organic coating that comprises a radiation susceptible material in accordance with the invention.

FIG. 1 shows an exemplary embodiment of a proppant 10. The proppant comprises a substrate 2 having a coating 4 disposed thereon that comprises the radiation susceptible material 6. The coating 4 can comprise an organic or an inorganic material. The substrate 2 can comprise an organic material and/or an inorganic material and/or a metal. The coating 4 can be uncured, partially cured or fully cured prior to use in a subterranean fracture. This curing can occur either inside and/or outside the subterranean fracture. Alternatively, the radiation susceptible material 6 can be disposed in the body of the proppant without a coating.

The coating 4 can optionally comprise particulate fillers or fibrous fillers 8 if desired. The proppant 10 comprises a metallic and/or inorganic substrate 2 that generally comprises a single particle or is an agglomerate comprising a plurality of particles. Examples of metals that can be used in the substrates are shape memory alloys. Shape memory alloys exhibit a "shape memory effect". The shape memory effect permits a reversible transformation between two crystalline states i.e., a martensitic state to an austenitic state and vice versa. Generally, in the low temperature, or martensitic state, shape memory alloys can be plastically deformed and upon exposure to some higher temperature will transform to an austenitic state, thereby returning to their shape prior to the deformation.

A suitable example of a shape memory alloy is a nickel titanium alloy such as NITINOL®). It is desirable for the shape memory alloys to be foamed. In one embodiment, a substrate manufactured from a shape memory alloy can be a solid prior to introduction into the fracture, but can expand into a foam after introduction into the fracture, which is generally at a higher temperature than the temperature above ground. This expansion will permit better conductivity of oil and gas from the fracture.

Naturally occurring organic and inorganic materials that are subsequently modified can also be used as the substrate. Suitable examples of organic and inorganic materials that are modified an used in the substrate are exfoliated clays (e.g., expanded vermiculite), exfoliated graphite, blown glass or silica, hollow glass spheres, foamed glass spheres, cenospheres, foamed slag, sintered bauxite, sintered alumina, or the like, or a combination comprising one of the foregoing organic and inorganic materials. Exemplary inorganic substrates may be derived from sand, milled glass beads, sintered bauxite, sintered alumina, naturally occurring mineral fibers, such as zircon and mullite, or the like, or a combination comprising one of the naturally occurring inorganic substrates. Hollow glass spheres can be commercially obtained from Diversified Industries Ltd.

The radiation susceptible material that is included in the coating on the substrate or in the substrate of the proppant is neutron-responsive so that it readily reacts to neutrons, such as by absorbing thermal neutrons to exhibit a relatively large atomic cross section. By such responsiveness to neutrons, the radiation susceptible material yields the characteristic gamma radiation or neutron absorption, which is distinguishable from the characteristics of the materials in the surrounding formation. These radiation susceptible materials are also initially non-radioactive so that they can be safely handled without fear or risk of radiation exposure or contamination at the surface of the well until after it is introduced into the system by which it is to be moved into the well. Such a material also will revert back to its natural (non-radioactive state) in a short period of time, such as on the order of minutes after activation.

Although the radiation susceptible material is initially non-radioactive, the isotope of the radiation susceptible material is one which either becomes radioactive, whereby the created radioactive isotope decays and emits gamma radiation detectable by a suitable detector, or otherwise undergoes a nuclear or atomic reaction, such as by simply absorbing one or more neutrons to an extent greater than the materials of the surrounding formation. Such a reaction can occur in response to the external neutrons emitted from an accelerator. If the original substance is to react by forming a radioactive isotope, the radioactive isotope preferably has a known half-life of between approximately a few seconds and up to about 30 minutes so that prolonged irradiation by the accelerator is not needed for the reaction to occur and so that adequate detection time exists once the conversion has occurred. It is advantageous that the susceptible material decays to a non-radioactive state shortly after the logging process is performed, thereby allowing the well to be brought back onto production without fear of producing radioactive material.

In one embodiment, the radiation susceptible materials have a half-life of about 5 seconds to about 20-30 minutes. In another embodiment, the radiation susceptible materials have a half-life of about 10 seconds to less than or equal to about 50 minutes. In yet another embodiment, the radiation susceptible materials have a half-life of about 12 seconds to less than or equal to about 7 minutes. An exemplary half-life for a radiation susceptible material is less than or equal to about 5 minutes. Vanadium has a half-life of 3.8 minutes, while indium has a half-life of 14.1 seconds. It is generally desirable for the period of measurable radiation to be of a length so that the material no longer emits radiation when the well starts producing hydrocarbons. In general, it is desirable for the radiation susceptible material to stop emitting measurable radiation before it is placed back on production. It is also advantageous in that after the half-life of the radiation susceptible material has expired, the well can be re-logged as many times as desired by re-irradiating the radiation susceptible material.

A suitable spectral gamma-ray logging tool may be utilized to measure the gamma radiation obtained front the radiation susceptible material after it is bombarded by neutrons. At least a portion of the tool, e.g., at least the gamma-ray detector, is placed within the well to provide the desired log. The tool can be such as to generate the desired ratios downhole, or the gamma-ray spectra can be transmitted to the surface and the ratios determined from the spectral data. Either a low resolution, e.g., NaI(Tl) or equivalent, detector (such as BGO crystal) or a high resolution, e.g., intrinsic germanium, Ge(Li) or equivalent detector can be used. NaI has some advantages that BGO does not in practical application. This includes its temperature dependence for gain stability and its slightly better resolution whenever one needs to do qualitative analysis. By using the library least-squares (LLS) approach only the qualitative analysis requires detectors with good resolution so that peaks can be identified. Quantitative analysis by using the entire spectrum with the LLS approach is essentially independent of resolution since the accuracy of this approach depends only on the 'overall shape' of the library spectra rather than the sharpness of the peaks. It is very important that the detector be stable (with respect to time and temperature) so that the collected counts are associated to the proper energy level. With the BGO detector this means putting the crystal in a temperature flask that is specifically design to maintain the crystal's temperature in an optimum performance range throughout the logging operation. Logs can be generated either in a continuous, moving tool mode, or in a stationary mode in which the tool is stopped at selected locations in the borehole.

Figure 2:
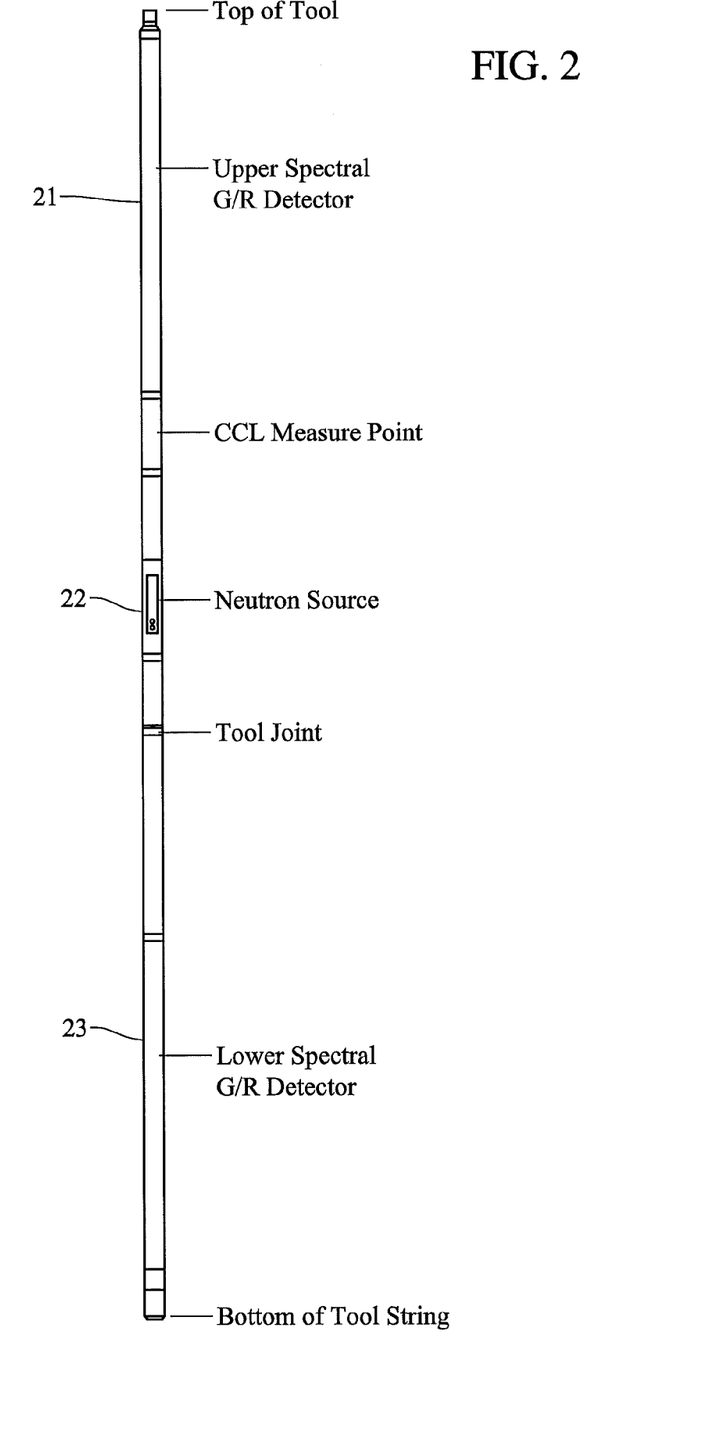
FIG. 2 depicts an exemplary well logging tool for use with the method and proppant of the present invention.

An example of a suitable logging tool is shown in FIG. 2. The tool includes an upper spectral gamma-ray detector 21, a neutron source 22, and a lower spectral gamma-ray detector 23. A collimator can be used on the detector if desired. In one embodiment, a rotating collimator is used to measure fracture orientation. Such collimators tend to increase the sensitivity of the measurement since such devices reduce the number of gamma rays entering the detector from locations up or down the borehole, i.e., gamma rays from proppant that is behind the casing but is above or below the current location of the detector. In one embodiment, a detector without a collimator can be used.

In one method of determining fracture height, tagged proppants and/or a tagged fracturing fluid are introduced into the formation. The tagged proppants and/or tagged fracturing fluid generally comprise indium and/or vanadium, however other tags may be suitable as well. The tagged proppant and/or tagged fracturing fluid is then bombarded with neutrons from the neutron source 22 during a logging pass. A logging pass is one wherein the logging tool is introduced into the well and wherein a neutron bombardment of the formation fracture is initiated. Gamma ray spectroscopy is then performed on the irradiated radiation susceptible material such as indium and vanadium to obtain gamma count rates both above and below the peak energies (also referred to as off-peak energies) coming from vanadium and/or indium. Gamma count rates are measured at the peak energies for indium and/or vanadium as well. In operation, the upper spectral detector is used to measure background radiation in the well prior to activation of the radiation susceptible material. The entire spectrum (all energy emissions) is measured both before and after exposure to the neutron source. The two measured spectrums are then overlaid on each other peaks that are not zeroed out by the subtraction process are identified. After that, the characteristic energy level emissions of the tagging element are identified.

Figure 3:
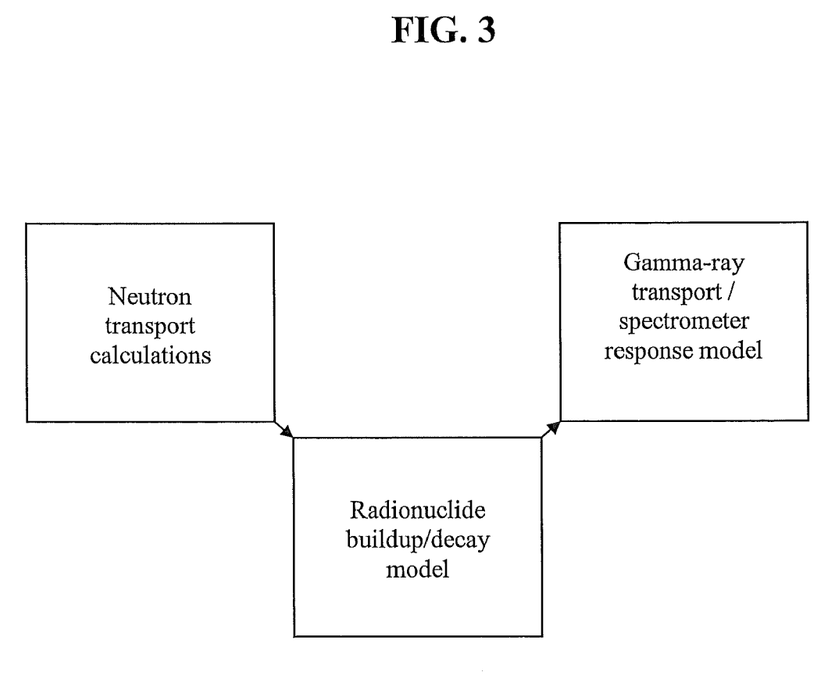
FIG. 3 depicts a block diagram of a method for analyzing measured neutron activation data from a well fracture in accordance with an embodiment of the present invention.

In accordance with the present invention, analysis of the gamma radiation data collected by the logging tool is performed by applying the collected data to a simulation model system. As shown in FIG. 3, the model system is based on three major components: a neutron transport model, a radionuclide buildup/decay model, and a gamma-ray transport/spectrometer response model.

The purpose of the model is to obtain neutron reaction rates as a function of the position of the reactive material relative to the neutron source position. The reaction rates that are obtained are those reactions where desired gamma-ray emitting nuclides are produced, in other words the production rates for any gamma-ray emitting radio-nuclides in which an analyst would be interested.

The neutron transport model is an important and potentially complex component of the model system. Due to the nature of neutron transport, a Monte Carlo approach to the neutron transport problem is preferred, and in one embodiment of the invention the highly versatile and widely known Monte Carlo N-Particle Transport Code, Version 5 (MCNP5) is used to model neutron transport behavior. The geometry and composition of the logging tool is modeled in the vicinity of the neutron source in three dimensions, and the atomic composition of the borehole fluid and the surrounding formation is also inputted into the simulation. A symmetric fracture is defined as an idealized slab containing a different atomic composition than the surrounding formation.

Figure 4:
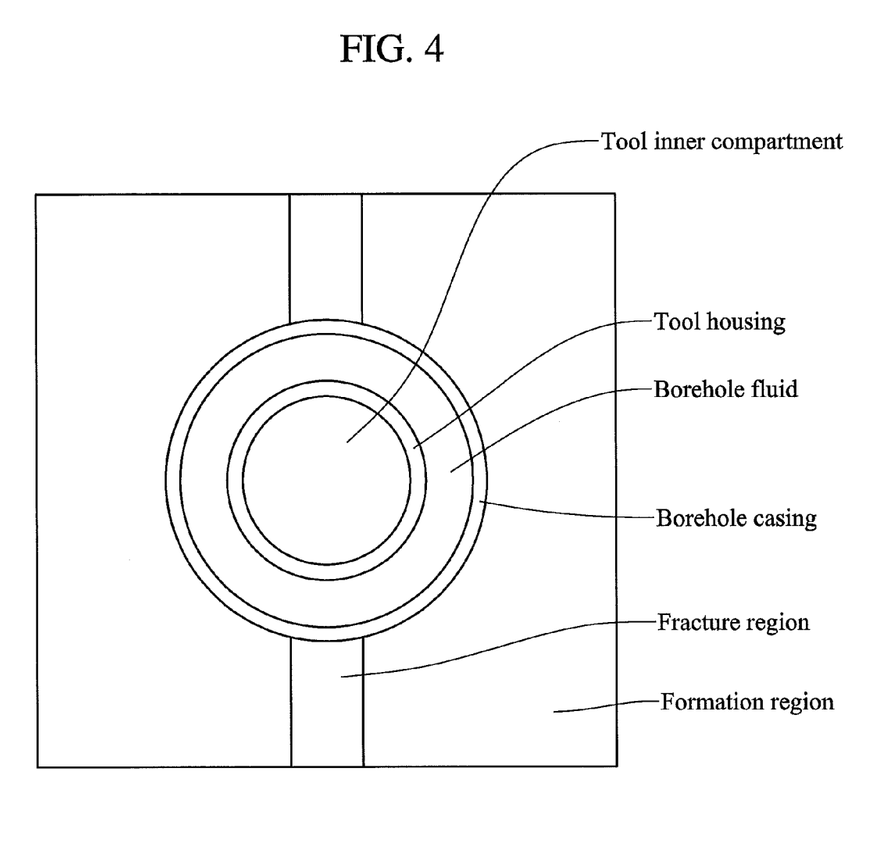
FIG. 4 depicts a cross-sectional view of a three-dimensional input to a neutron transport calculation model in accordance with the method of the present invention.

FIG. 4 illustrates a cross-sectional view of the three-dimensional geometric input to the neutron transport model. As shown, the input includes a tool inner compartment parameter, a tool housing parameter, a borehole fluid parameter, a borehole casing parameter, a fracture parameter, and a surrounding formation region parameter.

This approach enables the use of continuous energy cross-section data. This allows avoidance of the many problems that one meets when applying diffusion or discrete ordinate (or some Monte Carlo) neutron transport codes, such as the need to define an energy group structure. The result of using multi-group approaches is often an inability to quantify certainty or confidence in the obtained results, as the cross-sections for most neutron reactions (whose rates we wish to obtain) are highly dependent on the energy of the neutron. In accordance with the continuous energy cross-section approach, we simply apply the value of the appropriate cross-sections at the current Monte Carlo neutron's energy whenever it passes through a region of interest. By sampling large numbers of neutron tracks, we obtain an estimate of aggregate neutron behavior. Particular attention is given to the production of V-52 (if using vanadium as the radiation susceptible material) and whatever other isotope is deemed pertinent. Estimates of the rates of pertinent reactions in finite volumes with indexed positions are then obtained. These are essentially the nuclide production rates as a function of position relative to the source, that will be used in the radionuclide buildup and decay model component. To understand the details of the radionuclide buildup and decay model, it is important to note that in this case all the finite volumes are set to 1 cm in the vertical dimension. The neutron transport model is key to finding the quantitative relationship between the tag concentration and the fracture width. It is also important for determining spatial distributions of other activation products so that we can get good signatures for the LLS calculation. It is noted that the library spectra change shape—especially at low energies—when they are spatially distributed in different ways.

The main assumption of the neutron transport model is that the steady-state neutron flux simply follows along as the source moves up toward the surface, and a more complicated temporal adjustment is not necessary. This assumption can be made because time-dependent neutron population effects will not be important unless the desired logging speed is above 250 cm/second, which in most cases it is not as speeds that fast will not be suitable due to insufficient neutron exposure of the radiation susceptible proppant.

The loss rates for radio-nuclides are the product of the decay constant and the instantaneous population; it is this law that leads to the familiar characteristics of exponential decay. The radio-nuclide buildup and decay model uses the implicit or backward Euler method to numerically integrate the variable source neutron activation problem. Let a finite volume element be indexed by radial and axial indices i and j. The concentration C(t) of a given nuclide in volume element i,j is obtained by numerically integrating the variable neutron source activation equation:

$$\frac{dC}{dt_{i,j}} = \text{production } rate_{i,j} - \text{loss } rate_{i,j}$$

$$\frac{dC}{dt_{i,j}} = (N\sigma\phi)(t)_{i,j} - \lambda C(t)_{i,j}$$

$(N\sigma\phi)(t)_{i,j}$ represents the rate of production in volume element i,j taking into account the concentration of the target nuclide, the energy-dependent neutron cross-section, and the energy-dependent neutron flux. The production rate is derived from the neutron transport module results. $\lambda$ represents the decay constant of the radionuclide who concentration is C.

As the source moves past volume element i,j the production rate changes. So, the value of C is obtained for the instant when the neutron source has receded far enough away that production is no longer significant. In our first iteration this distance has been taken as 20 cm. So the equation above is numerically integrated over a 40 second exposure to a variable neutron source. The 40 seconds covers the 20 cm above and 20 cm below the source at a 1 cm/s logging speed. The exposure time is the distance divided by the logging speed (the variable 'vel'). The implicit Euler method can be applied, for example, using the following lines of FORTRAN code:

```
DO i=0,13
    DO k=19,0,-1
        ic0(i)=ic0(i)+n_sig_phi(i,k)/vel-lam*ic0(i)/vel
    ENDDO
    DO k=0,19,1
        ic0(i)=ic0(i)+n_sig_phi(i,k)/vel-lam*ic0(i)/vel
    ENDDO
ENDDO
```

The variable 'ic0' is the concentration at the instant the production rate is deemed no longer important. It is only a function of radial distance since all axial indices at the same radial distance wilt have the same instantaneous concentration at this instant, but the instant that each axial index reaches this concentration does not occur at the same time. The variables 'n_sig_phi' and 'lam' represent the production rates and decay constants respectively. To obtain the concentrations surrounding the spectrometer the following lines of FORTRAN code can be used:

```
DO k=0,39
    decfac(k)=exp(-lam*(sd/vel+20.-REAL(k)/vel))
    DO i=0,13
        c(i,k) = ic0(i)*decfac(k)
        IF (k<=19) THEN
            WRITE(*,*) "x= ",xyz(1,i), "z= ", xyz(3,k)-sd,
            "c= ", c(i,k), "dec= ", decfac(k)
        ELSE
            WRITE(*,*) "x= ",xyz(1,i), "z= ",
            xyz(3,k-20)+20-sd, "c= ", c(i,k), "dec= ",
decfac(k)
        ENDIF
    ENDDO
ENDDO
```

Where the c variable holds the concentration as a function of position, but the position indices are now for the position relative to the spectrometer position rather than the source position. This calculation is very similar to the implicit Euler method used to get the value of ic0, but with zero production rate. The variable sd is the source-detector spacing, taken initially to be 526.8 cm.

Concentrations of radio-nuclides that are present when the logging tool's lower spectrometer reaches a given position are then obtained by integrating (numerically) the instantaneous production rates and loss rates as the neutron source moves past that given position. The concentration of radio-nuclides surrounding the detector is transformed into a gamma-ray source term using basic nuclear data for gamma-ray emission. The gamma-ray source term is used in a photon transport calculation to determine the response of the spectrometer. What we accomplish by all these transformations and calculations is an estimate of the lower detector response for an assumed borehole environment.

Again, here MCNP5 is used to solve the radiation transport problem, only now using a gamma ray source derived from the position-dependent concentrations calculated in the radio-nuclide buildup and decay module, instead of neutron source. Energy deposition is tallied in the spectrometer for each simulated history to get an estimate of aggregate behavior that determines the observed spectrum. However, the Monte Carlo calculation does not take into account man of the inherent imperfections of a spectrometer. To obtain a less idealistic and more realistic spectrum, it may be also necessary to apply a response model for the spectrometer, essentially to spread out the spectrum to get realistically broad peaks that accurately simulate the behavior observed in a physical spectrometer.

The end result of the modeling system provides an expected spectrum for a given borehole environment and fracture size. By comparing an observed spectrum to a database of expected predicted calculated spectra for conditions similar to those of the fracture under measurement, an accurate estimate of the fracture geometry can be obtained.

Figure 5:
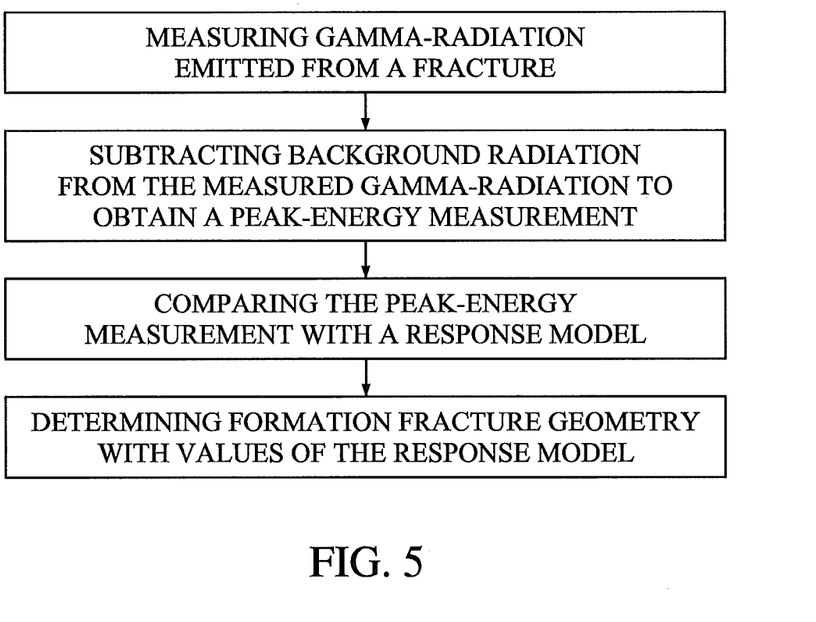
FIG. 5 depicts a flow chart scheme of one embodiment of a method of determining fracture geometry of a subterranean formation from radiation emitted from a fracture in said formation.
Figure 6:
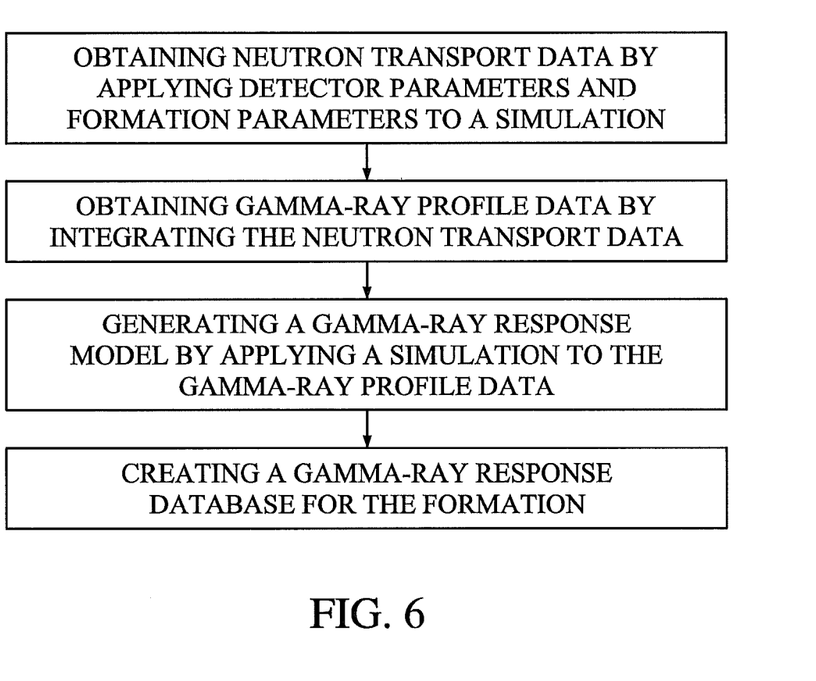
FIG. 6 depicts a flow chart scheme of one embodiment of a method for modeling geometrical parameters of a subterranean formation fracture detected by collecting gamma-radiation data stimulated by a neutron source.

FIG. 5 depicts a flow chart scheme of one embodiment of a method of determining fracture geometry of a subterranean formation from radiation emitted from a fracture in said formation. FIG. 6 depicts a flow chart scheme of one embodiment of a method for modeling geometrical parameters of a subterranean formation fracture detected by collecting gamma-radiation data stimulated by a neutron source.

Figure 7:
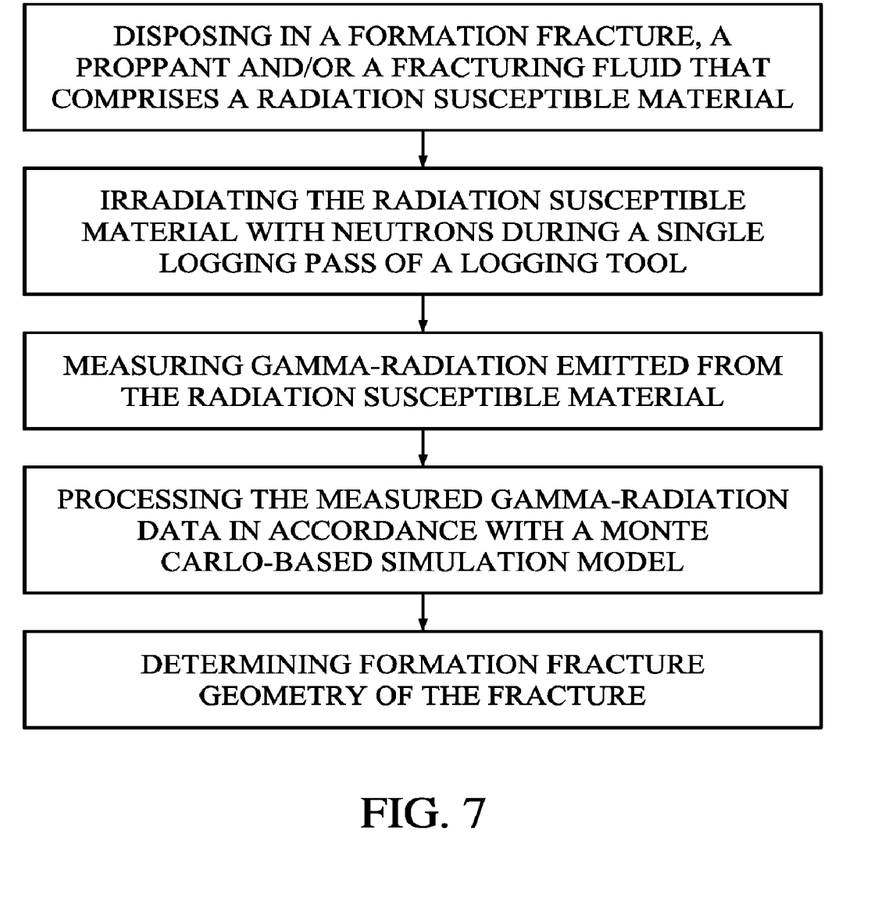
FIG. 7 depicts a flow chart scheme of one embodiment of a method of determining fracture geometry of a subterranean formation from radiation emitted from a material disposed in a fracture in said formation.

FIG. 7 depicts a flow chart scheme of one embodiment of a method of determining fracture geometry of a subterranean formation from radiation emitted from a material disposed in a fracture in said formation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of analyzing the results of a fracturing process, comprising:
    a) disposing in a formation fracture, a proppant and/or a fracturing fluid that comprises a radiation susceptible material;
    b) irradiating the radiation susceptible material with neutrons during a single logging pass of a logging tool;
    c) measuring gamma-radiation emitted from the radiation susceptible material;
    d) processing the measured gamma-radiation data in accordance with a Monte Carlo-based simulation model; and
    e) determining formation fracture geometry of the fracture.

2. The method of claim 1, wherein fracture geometry includes the height and width of a fracture formation.

3. The method of claim 1, wherein the radiation susceptible material have a half-life of about 5 seconds to about 50 minutes.

4. The method of claim 1, wherein the radiation susceptible material are selected from the group of vanadium, indium, and combinations thereof.

5. The method of claim 1, wherein the measuring gamma-radiation emitted from the radiation susceptible material comprises:
    measuring gamma-radiation emitted from the fracture; and then
    subtracting background radiation from the measured gamma-radiation to obtain a peak-energy measurement.

6. The method of claim 5, wherein the Monte Carlo simulation comprises a Monte Carlo N-Particle Transport Code.

7. The method of claim 5, wherein the logging tool comprises two radiation detectors, wherein one of the two radiation detectors is used to measure background radiation emissions.

8. The method of claim 7, wherein peak-energy of gamma radiation is received by the detectors as a result of activation of a radiation susceptible material in the fracture, and the one of the two radiation detectors receives radiation present in the subterranean formation before and after the activation.

9. The method of claim 8, wherein the activation is performed by bombardment of the radiation susceptible material with neutrons from a neutron source attached to the detectors.

10. The method of claim 1, wherein processing the measured gamma-radiation data in accordance with a Monte Carlo-based simulation model comprises applying the Monte Carlo-based simulation model to gamma-ray buildup/decay profile data and generating a gamma-ray transport/spectrometer response model.

11. The method of claim 10, wherein the gamma-ray buildup/decay profile data is obtained by integrating neutron transport data.

12. The method of claim 10, wherein the integrating is performed using an implicit Euler method or a backward Euler method.

13. The method of claim 12, wherein the neutron transport data is obtained by applying neutron source parameters and subterranean formation parameters to a Monte Carlo simulation.

14. The method of claim 13, wherein the neutron source parameters include neutron source, tool composition, tool geometry, and the subterranean formation parameters include borehole fluid composition and formation composition.

15. The method of claim 13, wherein the Monte Carlo simulation comprises a Monte Carlo N-Particle Transport Code.

* * * * *